United States Patent [19]

Keil et al.

[11] Patent Number: 4,576,973

[45] Date of Patent: Mar. 18, 1986

[54] COPOLYMER, PROCESS FOR ITS PREPARATION AND ITS USE AS A SORBENT

[75] Inventors: Karl-Heinz Keil, Hanau-Mittelbuchen; Fritz Engelhardt, Frankfurt; Ulrich Greiner, Schöneck; Klaus Kühlein, Kelkheim; Reinhold Keller, Bad Soden; Merten Schlingmann, Königstein; Gerhard Hess, Altenstadt, all of Fed. Rep. of Germany

[73] Assignee: Cassella Aktiengesellschaft, Frankfurt am Main, Fed. Rep. of Germany

[21] Appl. No.: 623,708

[22] Filed: Jun. 22, 1984

[30] Foreign Application Priority Data

Jul. 9, 1983 [DE] Fed. Rep. of Germany ....... 3324835

[51] Int. Cl.$^4$ ............................................. C08J 9/00
[52] U.S. Cl. .................................... 521/149; 521/56; 521/60; 526/239; 526/257; 526/258; 526/260; 526/261; 526/279
[58] Field of Search ................... 521/56, 60, 149, 152, 521/154

[56] References Cited

U.S. PATENT DOCUMENTS 3,817,745  6/1974  Copes et al. .
4,154,910  5/1979  Tauaka et al. ...................... 521/149
4,221,871  9/1980  Meitzner et al. .................... 521/149
4,246,362  1/1981  Sasaki et al. ........................ 521/149
4,256,842  3/1981  Sasaki et al. ........................ 521/149
4,323,702  4/1982  Kawabata et al. .

FOREIGN PATENT DOCUMENTS 3043766  6/1981  Fed. Rep. of Germany .

Primary Examiner—Morton Foelak
Attorney, Agent, or Firm—Connolly and Hutz

[57] ABSTRACT

The crosslinked, porous copolymer in the form of beads and containing 50 to 99.9% by weight of recurring units of a heterocyclic 5-membered ring compound which contains a polymerizable olefinic group and which has at least one protonizable nitrogen atom in the ring, 0.1 to 50% by weight of units of a crosslinking agent, 0 to 25% by weight of units of a polymerizable organoboron or organosilicon compound and, relative to 100% by weight of the sum of the abovementioned units, 5 to 350% by weight of units of an N-vinylamide of the general formula I $CH_2=CH-N(R^1)-C(R^2)=O$ wherein $R^1$ denotes hydrogen, methyl or ethyl and $R^2$ denotes hydrogen or $C_1-C_3$-alkyl, or several such N-vinylamides and 0 to 40% by weight of units of another polymerizable compound or several such compounds, is prepared by inverted suspension polymerization and is used, for example, as a sorbent for acid substances from solutions thereof, preferably aqueous solutions.

5 Claims, No Drawings

COPOLYMER, PROCESS FOR ITS PREPARATION AND ITS USE AS A SORBENT

The present invention relates to a crosslinked, porous copolymer in the form of beads, a process for its preparation and its use as a sorbent, in particular for the removal of acid substances from solvents.

The removal of carboxylic and mineral acids from solvents is becoming increasingly important in technology. This removal can be carried out with exchange resins. Thus a process for the removal of carboxylic acids using basic anion exchangers of the styrene type is described in Japanese Patent Specification No. 24,561/1971. The amount of carboxylic acid sorbed in this process is only slight and, in addition, desorption must be carried out with acetone and carbon dioxide gas under a pressure of 0.5 to 20 bar, which requires a considerable expenditure, particularly on a large industrial scale.

A process for isolating carboxylic acids from an aqueous solution is known from German Patent No. 3,043,766 C2, in which the sorbent employed is a crosslinked, polymeric compound having a pyridine skeleton structure. Divinylbenzene, divinyl phthalate and ethylene glycol diacrylate are mentioned as crosslinking agents. An aliphatic alcohol, a ketone or a carboxylic acid ester is used for desorption. The capacity of the sorbent used is, however, still too low and, in addition, the sorbent swells too strongly, so that the resistance to flow or the flow time is increased.

It has now been found, surprisingly, that the copolymer according to the invention has a high sorptive capacity for acid substances and a low swelling capacity. The crosslinked, porous copolymer in the form of beads, according to the invention, contains 50 to 99.9% by weight of recurring units of a heterocyclic, 5-membered ring compound which contains a polymerisable olefinic group and which has at least one protonisable nitrogen atom in the ring, or several such compounds, 0.1 to 50% by weight of units of a crosslinking agent or several such crosslinking agents, 0 to 25% by weight of units of a polymerisable organoboron and/or organosilicon compound or several such compounds and, relative to 100% by weight of the sum of the abovementioned units, 5 to 350% by weight of units of an N-vinylamide of the general formula $H_2=CH-N(R^1)-C(R^2)=O$ where $R^1$ denotes hydrogen, methyl or ethyl and $R^2$ denotes hydrogen or $C_1-C_3$-alkyl, or several such N-vinylamides and 0 to 40% by weight of units of another polymerisable compound or several such compounds.

In addition to hydrogen, $R^2$ can denote methyl, ethyl, propyl or isopropyl. Preferably, $R^1$ and $R^2$ independently of one another denote hydrogen or methyl.

In many cases the copolymer advantageously only contains 0 to 25% by weight of units of other polymerisable compounds instead of 0 to 40% by weight of units of other polymerisable compounds, relative to 100% by weight of units of the polymerisable, heterocyclic 5-membered ring compounds, units of the crosslinking agents and, if present, units of polymerisable organoboron and/or organosilicon compounds. Relative to the 100% by weight already mentioned of units of the polymerisable, heterocyclic 5-membered ring compounds, of the crosslinking agents and, if present, of the organoboron and/or organosilicon compounds, there can be present in the copolymer, for example, 10 to 40% by weight, preferably 10 to 110% by weight and very particularly preferably 10 to 250% by weight of units of one or more N-vinylamides of the general formula I.

A preferred embodiment of the copolymer according to the invention contains 50 to 95% by weight of recurring units of a heterocyclic 5-membered ring compound which contains a polymerisable olefinic group and has at least one protonisable nitrogen atom in the ring, or several such compounds, 5 to 50% by weight of units of a crosslinking agent or several such crosslinking agents, 0 to 25% by weight of units of a polymerisable organoboron or organosilicon compound or several such compounds and, relative to 100% by weight of the sum of the abovementioned units, 10 to 250% by weight of units of an N-vinylamide of the general formula I or several such N-vinylamides and 0 to 25% by weight of units of another polymerisable compound or several such compounds.

Copolymers, according to the invention, which are also particularly preferred are those which contain at least 0.1% by weight, preferably 0.1 to 10% by weight, of units of polymerisable organosilicon and/or organoboron compounds, especially if these compounds act as units of n-functional crosslinking agents.

Copolymers, according to the invention, which are also preferred are those which do not contain units of other polymerisable compounds.

The copolymer according to the invention contains units of a heterocyclic 5-membered ring compound which contains a polymerisable olefinic group and has at least one protonisable nitrogen atom in the ring, or several such compounds, and also units of one or more crosslinking agents as well as units of one or more N-vinylamides. The copolymer according to the invention can, if appropriate, also contain units of one or more polymerisable organosilicon and/or organoboron compounds and units of one or more other polymerisable compounds. Units are to be understood here as meaning the groups which are statistically distributed in the copolymer and which have been formed from the polymerisable monomeric compounds employed for the preparation of the copolymer.

The polymerisable olefinic group of the heterocyclic 5-membered ring compound having at least one protonisable nitrogen atom in the nucleus is as a rule directly attached to the nucleus, but can also be indirectly attached, for example via an oxygen or sulphur atom, and normally has the general formula II

$$-(CH_2)_m-C(R^3)=C(R^4)H \qquad (II)$$

wherein $R^3$ and $R^4$ independently of one another denote hydrogen or $C_1-C_4$-alkyl and m denotes a number from 0 to 4. The combination $H/CH_3$ or $CH_3/H$ or $H/H$ is preferred for the radicals $R^3$ and $R^4$. 1, but particularly 0, is preferred for m.

The recurring units, present in the copolymer according to the invention, of a heterocyclic 5-membered ring compound having at least one protonisable nitrogen atom in the ring therefore have, as a rule, the general formula III

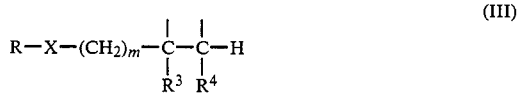

(III)

wherein R denotes the radical of a heterocyclic 5-membered ring compound having at least one protonisable nitrogen atom in the ring, $R^3$ and $R^4$ denote hydrogen or $C_1$–$C_4$-alkyl, X denotes —O— or —S— or, preferably, a direct bond and m denotes a number from 0 to 4, preferably 1 but particularly 0. The radical R of the heterocyclic 5-membered ring compound can have, for example, one, two, three or four nitrogen atoms, at least one of which must be protonisable, and the heterocyclic ring can also, if appropriate, contain, in addition, another hetero-atom or several other hetero-atoms, especially oxygen and/or sulphur. Protonisable nitrogen atoms are basic nitrogen atoms having a free electron pair which are incorporated, for example, in the 5-membered ring as —N=, —NH— or

Nitrogen atoms which are adjacent, for example, to a keto group no longer possess basic properties and can, therefore, no longer be protonised. The heterocyclic 5-membered ring can be saturated, partly saturated or unsaturated and can represent, for example, an imidazole, imidazoline, oxazole, oxazoline, oxazolidine, thiazole, oxadiazole, pyrrole, triazole or tetrazole and can, if appropriate, also contain one or more $C_1$–$C_4$-alkyl and/or $C_2$–$C_4$-hydroxyalkyl groups. Polymerisable olefinic groups are, in particular, the vinyl, allyl, methallyl or isopropenyl group. The following examples may be mentioned of a heterocyclic 5-membered ring compound which contains a polymerisable olefinic group and has at least one protonisable nitrogen atom in the ring: 1-vinyl-1,2,3-triazole, 1-vinyl-1,2,4-triazole, 4-vinyl-1,2,3-triazole, 5-vinyl-1,2,3-triazole, 1-vinyl-1,2,3,4-tetrazole, 2-vinyl-1,2,3,4-tetrazole, 2-allyl-1,2,3,4-tetrazole, 1-allyl-1,2,3,4-tetrazole, 1-methyl-5-vinyl-1,2,3,4-tetrazole, 2-methyl-5-vinyl-1,2,3,4-tetrazole, 3-vinyl-1,2,4-oxadiazole, 3-vinyl-5-methyl-1,2,4-oxadiazole, 3-isopropenyl-1,2,4-oxadiazole, 2-isopropenyl-1,3,4-oxadiazolin-5-one, 3-isopropenyl-1,2,4-oxadiazole, 3-isopropenyl-5-methyl-1,2,4-oxadiazole, 2-vinyloxazoline, 2-isopropenyloxazoline, 2-vinyl-3-methyloxazolidine, 2-vinylthiazole, 4-vinylthiazole, 1-vinyl-2-imidazoline, 2-vinyl-4-methyl-2-imidazoline, 2-vinyl-5-methyl-2-imidazoline, 1-vinyl-2-methyl-2-imidazoline, 1-vinylimidazole, 1-methyl-2-vinylimidazole, 1-vinyl-2-methylimidazole, 1-vinyl-4-(2-hydroxyethyl)imidazole, N-vinylpyrrole, 2-isopropenyl-2-imidazoline, 2-vinyl-3-methyl-2-imidazoline and 1-vinyl-2,4-dimethylimidazole.

The crosslinking agent links n polymer chains to one another, n being a number equal to or greater than 2. n is especially 2,3 or 4, preferably 2.

Examples of suitable crosslinking agents are compounds containing, in the molecule, n polymerisable radicals, particularly those of the formula $CH_2=CH-$, $CH_2=CH-CH_2-$ or $CH_2=CH(R^5)-CO-$ or $CH_2=CH(R^5)-CO-O-$, n having the meaning already mentioned, normally 2, 3 or 4 and preferably 2, and $R^5$ denoting hydrogen or $C_1$–$C_4$-alkyl, in particular hydrogen or methyl. The following are examples of crosslinking agents of this type: triallyl cyanurate, triallyl phosphate, N,N′,N″-trisacryloylperhydrotriazine, 1,2,3-trivinyloxypropane, tetraallyoxyethane, pentaallylsucrose, triallylamine, N,N′,N″-tris-(2-acryloyloxyethyl) isocyanurate, N,N′,N″-tris-(2-methacryloyloxyethyl) isocyanurate, diallyl ethylenephosphonate, ethylene glycol 1,2-bis-(ethylenephosphonate) and also, in general, compounds of the formulae IV, V or VI

wherein $R^5$ has the meaning already mentioned, n normally denotes 2, 3 or 4, preferably 2, and $R^7$ represents the radical of a di-tri, tetra- or poly-carboxylic acid formed by the removal of n acid H atoms and $R^8$ represents the radical of a di-, tri-, tetra- or poly-ol formed by the removal of n hydroxylic hydrogen atoms and $R^6$ represents the radical of an aliphatic, aromatic or heteroaromatic hydrocarbon formed by the removal of n hydrogen atoms.

Suitable crosslinking agents of the formula IV are divinylbenzenes, in particular 1,4-divinylbenzene, trivinylbenzenes, divinylpyridines and divinylquinolines.

Examples of suitable crosslinking agents of the formula V are triallyl tricarballylate, triallyl aconitate, triallyl citrate, triallyl trimesinate, triallyl trimellitate, diallyl oxalate, divinyl phthalate and diallyl maleate, fumarate, adipate and phthalate.

Examples of suitable crosslinking agents of the formula VI are trimethylolpropane triacrylate and trimethacrylate, pentaerythritol tetraacrylate and tetramethacrylate, pentaerythritol triacrylate and trimethacrylate, dimethylene glycol diacrylate or dimethacrylate and butylene glycol diacrylate or dimethacrylate.

Compounds of the general formula VI which are particularly suitable are the diacrylates and particularly the dimethacrylates of ethylene glycol, of diethylene glycol and of polyethylene glycols 200 to 600, particularly the dimethacrylates of polyethylene glycols 200 to 600.

Further examples of suitable crosslinking agents are diallylamine, divinyl ketone, divinyl sulphone and diallylmelamine.

Difunctional crosslinking agents and water-soluble crosslinking agents are preferred. Suitable water-soluble crosslinking agents are, in particular, derivatives of acrylic or methacrylic acid, such as, for example, N,N′-methylenebisacrylamide, N,N′-methylenebismethacrylamide, N,N′-methylenebis-(N-hydroxymethylmethacrylamide), N,N′-bis-(methacryloyl)-aminoacetic acid, N,N′-bis-(acryloyl)-aminoacetic acid, 1,2-bis-(acrylamido)-1,2-dihydroxyethane, 1,2-bis-(methacrylamido)-1,2-dihydroxyethane, 1,2-bis-(N-hydroxymethylmethacrylamido)-1,2-dihydroxyethane, 1,2-bis-(N-methoxymethylmethacrylamido)-1,2-dimethoxyethane, 1,6-bis-(acrylamido)-hexane, 1,6-bis-(methacrylamido)-hexane, 2-methyl-1,4-bis-(acrylamido)-butane ("isovalerilydenebisacrylamide"), 2-methyl-1,4-bis-(methacrylamido)-butane ("isovalerilydenebismethacrylamide") and the diacrylates and dimethacrylates of ethylene glycol, diethylene glycol and polyglycols 200 to 600.

Combinations of two or more crosslinking agents are also advantageous, for example combinations of N,N′-methylenebisacrylamide/N,N-bis-(acryloyl)-aminoacetic acid; N,N′-methylenebisacrylamide/isovalerilydenebisacrylamide; and N,N′-methylenebisacrylamide/ethylene glycol 1,2-bis-(ethylenephosphonate). Preferred combinations of crosslinking agents can contain, as one crosslinking component, not only N,N'-methylenebisacrylamide and/or N,N'-methylenebismethacrylamide, but also the diacrylates and/or dimethacrylates of ethylene glycol, diethylene glycol or polyethylene glycols 200 to 600 or N,N',N''-tris-(2-acryloyloxyethyl) isocyanurate or N,N',N''-tris-(2-methacryloyloxyethyl) isocyanurate. Combinations of crosslinking agents which are particularly preferred contain or consist of N,N'-methylenebisacrylamide/dimethacrylate of polyethylene glycol 200 to 600 and/or the corresponding methacrylamide and/or the corresponding diacrylate.

Suitable n-functional crosslinking agents are, however, also compounds which contains only one or two polymerisable olefinic double bonds in the molecule, but which, by virtue of secondary reactions, can additionally link to one another (n−1) or (n−2) polymer chains, respectively. Examples of crosslinking agents of this type are silanes which contain alkoxy groups and in which the alkoxy groups are hydrolysed intermediately to give Si—OH groups in an aqueous medium. Two silanol groups of this type then effect, by means of a condensation reaction and the formation of a siloxane bond Si—O—Si, the linking of two chains. Examples of suitable crosslinking agents of this type are the organosilicon compounds indicated later, provided that they contain 1 or 2 olefinic double bonds and (n−1) or (n−2) alkoxy groups, respectively.

Examples of suitable N-vinylamides of the general formula I are N-vinylformamide, N-vinylacetamide, N-vinyl-N-methylacetamide, N-vinyl-N-methylformamide, N-vinyl-N-ethylacetamide, N-vinylpropionamide, N-vinyl-N-methylpropionamide, N-vinyl-N-ethylpropionamide, N-vinylbutyramide, N-vinyl-N-methylbutyramide and N-vinyl-N-ethylbutyramide. N-vinylformamide and particularly N-vinyl-N-methylacetamide are particularly suitable. The N-vinylamides of the general formula I incorporate, in the copolymer according to the invention, units of the general formula VII

wherein $R^1$ and $R^2$ have the meanings already mentioned.

Of the polymerisable organosilicon or organoboron compounds the polymerisable organosilicon compounds are preferred. Examples of suitable polymerisable organosilicon compounds are silanes, siloxanes and silazanes containing polymerisable olefinic groups.

Examples of suitable polymerisable organosilicon and organoboron compounds are 3-(trimethoxysilyl)-propyl acrylate or methacrylate, 3-(triethoxysilyl)-propyl acrylate or methacrylate, 3-(tri-(methoxyethoxy)-silyl)-propyl acrylate or methacrylate, 3-(tri-(methoxyethoxy)-silyl)-propyl acrylate or methacrylate, 3-(di-(methoxy)-methylsilyl)-propyl acrylate or methacrylate, 3-(di-(ethoxy)-ethylsilyl)-propyl acrylate or methacrylate, vinyltriethoxysilane, vinyltrimethoxysilane, vinyltriallyloxysilane, allyltriallyloxysilane, vinylmethyldiethoxysilane, vinylmethyldimethoxysilane, vinyltriacetoxysilane, vinyltri-(methoxyethoxy)-silane, 1,3-divinyl-1,1,3,3-tetramethyldisiloxane, 1,3-divinyl-1,1,3,3-tetramethyldisilazane,
$CH_2=CH—COO—(CH_2)_3—(Si—(CH_3)_p—O)_3—Si(CH_3)_2—(CH_2)_2—O—CO—CH=CH_2$,
$CH_2=C(CH_3)—COO—(CH_2)_3—(Si(CH_3)_2—O)_p—Si(CH_3)_2—(CH_2)_2—O—CO—C(CH_3)=CH_2$
wherein p denotes a number from 1 to 20, in particular a number from 1 to 10, $CH_2=CH—CH_2—NH—SiH(CH_3)—N(CH_2CH=CH_2)—SiH(CH_3)—NH—CH_2—CH=CH_2$, triallyl borate and trimethallyl borate. The polymerisable organosilicon or organoboron compounds can also, if the requirements for this exist, be employed as n-functional crosslinking agents or, at the same time, as polymerisable organosilicon or organoboron compounds and as crosslinking agents.

Other suitable polymerisable compounds are those which do not belong to any of the groups mentioned above and have only one polymerisable olefinic group in the molecule and can be incorporated in the copolymer in a small amount without modifying its properties appreciably, for example β-hydroxyethyl acrylate, β-hydroxyethyl methacrylate, styrene, acrylonitrile and methacrylonitrile.

The porous copolymers in the form of beads, according to the invention, are prepared by inverted suspension polymerisation by copolymerising 50 to 99.9% by weight of one or more heterocyclic 5-membered ring compounds which contain a polymerisable olefinic group and have at least one protonisable nitrogen atom in the ring, 0.1 to 50% by weight of one or more crosslinking agents, 0 to 25% by weight of one or more polymerisable organoboron and/or organosilicon compounds and, relative to 100% by weight of the sum of the abovementioned compounds, 5 to 350% by weight of one or more N-vinylamides of the formula I and 0 to 40% by weight of one or more other polymerisable compounds.

Preferably, 50 to 95% by weight of a heterocyclic 5-membered ring compound which contains a polymerisable olefinic group and which has at least one protonisable nitrogen atom in the ring, or several such compounds, 5 to 50% by weight of a crosslinking agent or several such crosslinking agents, 0 to 25% by weight of one or more polymerisable organoboron and/or organosilicon compounds and, relative to 100% of the sum of the above-mentioned compounds, 10 to 250% by weight of one or more N-vinylamides of the general formula I and 0 to 25% by weight of units of another polymerisable compound or several such compounds are copolymerised.

It is very particularly preferable to employ in the copolymerisation no compounds belonging to the group of other polymerisable compounds and/or 0.1 to 10% by weight of one or more polymerisable organoboron and/or organosilicon compounds.

As a rule, the polymerisable monomers can be employed in this reaction in a commercial form, that is to say without prior purification.

In the process of inverted suspension polymerisation, as a rule a 15 to 80% strength by weight aqueous solution of the monomers is suspended in an inert, hydrophobic liquid and is copolymerised therein in the presence of a lipophilic protective colloid, normally at temperatures of 40° to 95° C., preferably 60° to 80° C., to give porous, copolymeric products in bead form. The process of inverted suspension polymerisation is described, for example, in German Patent Specification No. 1,081,228. In this process the substances to be copolymerised are advantageously dissolved in water one after the other. However, solid substances can, if appropriate, also be first dissolve in liquid substances, and the solution thus obtained can then be dissolved in water. It can be necessary to add a small amount of an alkali metal hydroxide solution, such as, for example, potassium hydroxide or sodium hydroxide solution, in order to dissolve the substances in water. Water-insoluble crosslinking agents, such as, for example, divinylbenzene, and also, in certain cases, other polymerisable compounds, such as, for example, 2-hydroxyethyl acrylate, 2-hydroxyethyl methacrylate, 2-hydroxypropyl acrylate or 2-hydroxypropyl methacrylate, are dissolved in the hydrophobic liquid before the aqueous solution is added.

The copolymerisation is initiated in a manner which is in itself known, for example by UV light or radiation of a high energy content, but, as a rule, by means of an initiator which is soluble in the mixture of monomers and produces free radicals. Examples of suitable initiators are benzoyl peroxide, tert.-butyl hydroperoxide, cymene peroxide, methyl ethyl ketone peroxide, lauroyl peroxide, tert.-butyl perbenzoate, tert.-butyl diperphthalate, azodiisobutyronitrile, 2,2'-azobis-(2,4-dimethylvaleronitrile), 2-phenylazo-2,4-dimethyl-4-methoxyvaleronitrile, 2-cyano-2-propylazoformamide, azodiisobutyramide and dimethyl, diethyl or dibutyl azobismethylvalerate. Relative to the amount of monomers (including crosslinking agents) about 0.01 to 2% by weight, preferably 0.1 to 1% by weight, of initiator are used.

The free-radical initiator or the mixture of various free-radical initiators can be added to the water phase and/or the oil phase.

Any water-immiscible, inert liquids which can be separated off easily from the copolymer can be used as the hydrophobic liquids forming the oil phase. Examples of liquids of this type are organic solvents, in particular hydrocarbons, such as, for example, cyclohexane, n-pentane, n-hexane, n-heptane and i-octane, industrial mixtures of hydrocarbons, toluene, xylene and halogenated hydrocarbons, such as, for example, chlorobenzene and o-dichlorobenzene. Mixtures of different organic solvents are also suitable.

The lipophilic protective colloid must be soluble in the hydrophobic liquid used; it prevents the finely divided disperse aqueous phase from coalescing. Examples of suitable lipophilic protective colloids are high-molecular organic substances, such as, for example, cellulose derivatives, polymeric maleic acid derivatives containing alkyl vinyl ethers, polymaleic acid esters, alkyl acrylates and dialkylamino acrylates and methacrylates, and also sorbitan esters, ethoxylated fatty acid amides and glycerol fatty esters.

Further suitable lipophilic protective colloids are described, for example, in German Patent No. 2,634,486 B2. These are reaction products which have been obtained by reacting polybutadiene oils containing hydrogen atoms in the allyl positions, or oils and/or resins which contain hydrogen atoms in the allyl positions and which have been prepared by copolymerising olefins and diolefins having 4 to 6 C atoms and have a molecular weight of 750 to 50,000, with 2 to 30% by weight of maleic anhydride, relative to the oils and resins. The commercial products Lithene ® LX16-10MA and Lithene ® PM-25MA made by Revertex Ltd., Templefields, Harlow, Essex, Great Britain, for example, are also suitable.

The lipophilic protective colloid, or a mixture of different lipophilic protective colloids, is employed as a rule in amounts of 0.05 to 3% by weight, preferably 0.1 to 1% by weight, relative to the amount of hydrophobic liquid. The ratio between the volumes of the aqueous solution and of the hydrophobic liquid is normally 1:(2 to 50). The aqueous solution is dispersed in a manner which is in itself known, preferably by vigorous stirring, in the oil phase to which the lipophilic protective colloid has been added. It is advantageous to carry out the copolymerisation with the exclusion of oxygen. This can be effected in a known manner by flushing with, or passing through, an inert gas, such as, for example, nitrogen. As a rule, the copolymerisation is complete after 0.3 to 3 hours. When the copolymerisation is complete, the resulting copolymer in the form of beads is separated off, washed with water or an organic solvent and dried.

The crosslinked copolymer according to the invention is in the form of porous beads the diameter of which can be selected within the range from approx. 2 to 0.04 mm by choosing the conditions of preparation, in particular the stirrer speed and/or the lipophilic protective colloid. Under given conditions of preparation, beads having a narrow spectrum of diameters are obtained. In particular, the copolymer according to the invention is in the form of beads having a diameter of 0.04 to 0.15 mm, preferably 0.04 to 0.08 mm, and is excellently suitable for use as a sorbent, in particular as a sorbent for acid substances from solvents. Within the scope of the present invention, acid substances are to be understood as meaning substances of the general formula HA which can dissociate in a solvent of the general formula Lm (as a rule water or a mixture of solvents containing water) into $LmH^+$ and an acid radical $A^-$. Examples of acid substances of this type are carboxylic acids, sulphonic acids, mineral acids, thiocarboxylic acids, phenols, thiophenols, mercaptans, acid imides and acid sulphimides. The said acid organic substances can also be substituted and/or contain several identical or different acid groups in the molecule.

Examples of suitable aliphatic and aromatic mono-, di- and poly-carboxylic acids, hydroxycarboxylic acids and ketocarboxylic acids are formic acid, acetic acid, propionic acid, n-butyric acid, i-butyric acid, n-valeric acid, trimethylacetic acid, caproic acid, n-hepotic acid, caprylic acid, capric acid, pelargonic acid, stearic acid, tallow fatty acid, fluoroacetic acid, chloroacetic acid, bromoacetic acid, iodoacetic acid, dichloroacetic acid, 2-chloropropionic acid, glycollic acid, lactic acid, methoxyacetic acid, thioglycollic acid, cyanoacetic acid, glyoxylic acid, malonic acid, acrylic acid, methacrylic acid, vinylacetic acid, phenylacetic acid, oxalic acid, succinic acid, glutaric acid, adipic acid, maleic acid, fumaric acid, phthalic acid, isophthalic acid, terephthalic acid, citric acid, malic acid, benzilic acid, aconitic acid, trimesic acid, benzoic acid, cinammic acid, mandelic acid, tartaric acid, salicylic acid, acetoacetic acid, hydroxybenzoic acid, gallic acid and dihydroxybenzoic acid. Examples of further suitable acids are 6-aminopenicillanic acid and 7-aminocephalosporanic acid.

Examples of suitable mineral acids are sulphuric acid, phosphoric acid, phosphorous acid and hydrochloric acid.

The copolymers according to the invention are also particularly suitable for the sorption of sulphonic acids, such as, for example, benzenesulphonic acid or naphthalene-1-sulphonic acid or naphthalene-2-sulphonic acid or naphthalenedisulphonic, naphthalenepolysulphonic, benzenedisulphonic or benzenepolysulphonic acids, and also, in particular, for the sorption of substituted sulphonic acids, for example those belonging to the benzene, naphthalene and anthraquinone series, such as are used in some cases in the manufacture of dyestuffs, in particular azo dyestuffs. Sulphonic acids of this type can be, for example, mono-, di- or tri-sulphonic acids and can be monosubstituted or polysubstituted, for example, by hydroxyl, amino, carboxyl, halogen, nitro or alkyl having 1 to 4 C atoms. Sulphonic acids of this type are known in the dyestuffs industry in some cases by their trivial names or the names of their discoverers or by alphanumerical designations (="letter acids"). However, in the following exemplary selection of suitable sulphonic acids, sulphonic acids of this type are quoted by their systematic names: 3-methylbenzenesulphonic acid, benzene-1,3-disulphonic acid, methylbenzene-2,4-disulphonic acid, 2,4-dimethylbenzenesulphonic acid, 2,5-dimethylbenzenesulphonic acid, 2,6-dimethyl-4-tert.butylbenzenesulphonic acid, hydrindene-5-sulphonic acid, benzaldehyde-2,4-disulphonic acid, 4-chlorobenzenesulphonic acid, 2,5-dichlorobenzenesulphonic acid, 2-aminobenzenesulphonic acid, 3-aminobenzenesulphonic acid, aminobenzene-2,5-disulphonic acid, 1,3-diaminobenzene-4-sulphonic acid, 1,3-diaminobenzene-4,6-di-sulphonic acid, 1,4-diaminobenzene-2,5-disulphonic acid, 2-amino-5-methylbenzenesulphonic acid, 2-amino-3,5-dimethylbenzenesulphonic acid, 2-amino-4-sulphobenzoic acid, 2-amino-5-sulphobenzoic acid, 2-isobutylamino-5-sulphobenzoic acid, 2-hydroxy-5-sulphobenzoic acid, 2-aminophenyl-4-sulphonic acid, 3-amino-4-methoxybenzenesulphonic acid, 2-aminophenyl-4,6-disulphonic acid, 2-amino-5-chlorobenzenesulphonic acid, 3-amino-4-chlorobenzenesulphonic acid, 2-amino-4,5-dichlorobenzenesulphonic acid, 4-amino-2,5-dichlorobenzenesulphonic acid, 2-amino-5-chloro-4-methylbenzenesulphonic acid, 3-amino-5-chloro-4-methylbenzenesulphonic acid, 4-amino-5-chloro-3-methylbenzenesulphonic acid, 5-amino-4-chloro-3-methylbenzenesulphonic acid, anthraquinone-1-sulphonic acid, anthraquinone-2-sulphonic acid, anthraquinone-1,5-disulphonic acid, anthraquinone-1,8-disulphonic acid, anthraquinone-2,6-disulphonic acid, anthraquinone-2,7-disulphonic acid, 2-, 4-, 5- or 7-hydroxynaphthalene-1-sulphonic acid, 6-hydroxynaphthalene-2-sulphonic acid, 7-hydroxynaphthalene-2-sulphonic acid, 4-hydroxynaphthalene-1,5-disulphonic acid, 7-hydroxynaphthalene-1,5-disulphonic acid, 4-hydroxynaphthalene-1,6-disulphonic acid, 8-hydroxynaphthalene-1,6-disulphonic acid, 7-hydroxynaphthalene-1,3-disulphonic acid, 3-, 4- or 5-hydroxynaphthalene-2,7-disulphonic acid, 4-hydroxynaphthalene-2,5-disulphonic acid, 6-hydroxynaphthalene-1,4-disulphonic acid, 6-hydroxynaphthalene-1,7-disulphonic acid, 2-, 4-, 5-, 6-, 7- or 8-aminonaphthalene-1-sulphonic acid, 4-, 5-, 6-, 7- or 8-aminonaphthalene-2-sulphonic acid, 6-aminonaphthalene-1,3-disulphonic acid, 7-aminonaphthalene-1,3-disulphonic acid, 3-aminonaphthalene-1,5-disulphonic acid, 4-aminonaphthalene-1,5-disulphonic acid, 4-aminonaphthalene-1,6-disulphonic acid, 8-aminonaphthalene-1,6-disulphonic acid, 4-aminonaphthalene-1,7-disulphonic acid, 4-aminonaphthalene-2,6-disulphonic acid, 1-, 3- or 4-aminonaphthalene-2,5-disulphonic acid, 8-aminonaphthalene-1,3,6-trisulphonic acid, 7-aminonaphthalene-1,3,5-trisulphonic acid, 4-aminonaphthalene-1,5,7-trisulphonic acid, 4-aminonaphthalene-2,5,7-trisulphonic acid, 4-amino-3-hydroxynaphthalene-1-sulphonic acid, 4-amino-5-hydroxynaphthalene-1-sulphonic acid, 6-, 7- or 8-amino- 4-hydroxynaphthalene-2-sulphonic acid, 2-amino-5-hydroxynaphthalene-1,7-disulphonic acid, 4-amino-5-hydroxynaphthalene-1,7-disulphonic acid, 4-amino-5-hydroxynaphthalene-1,3-disulphonic acid, 3-amino-5-hydroxynaphthalene-2,7-disulphonic acid, 4-amino-5-hydroxynaphthalene-2,7-disulphonic acid, 4,6-dihydroxynaphthalene-2-sulphonic acid, 6,7-dihydroxynaphthalene-2-sulphonic acid, naphthalene-1,5-, -1,6-, -2,7-, -2,5-, -3,6- or -2,6-disulphonic acid, naphthalene-1,5,7-trisulphonic acid, naphthalene-2,5,7-trisulphonic acid, 4-hydroxynaphthalene-2,5,7-trisulphonic acid, 4,5-dihydroxynaphthalene-2,7-disulphonic acid and 4-hydroxy-7-phenylaminonaphthalene-2-sulphonic acid.

Salts of sulphonic acids having an acid reaction, in particular sodium or ammonium salts having an acid reaction, such as, for example, the Na salt of 6,7-dihydroxynaphthalene-2-sulphonic acid, G-salt as it is called (the Na salt of 6-hydroxynaphthalene-2,4-disulphonic acid) and R-salt as it is called (the Na salt of 6-hydroxynaphthalene-2,7-disulphonic acid) are also sorbed.

The following are also suitable: thiophenol, m-thiocresol, 2-bromothio-p-cresol, ethanethiol, phenylmethanethiol, 1,4-butanedithiol, 4-mercapto-2-pyridinecarboxylic acid, 2,3-dimercaptosuccinic acid, dithioacetic acid, thioacetic O-acid, thioacetic S-acid, phthalimide, succinimide and benzenesulphimide.

In the presence of mineral acids, sulphonic acids are sorbed preferentially by the copolymers according to the invention. The copolymers according to the invention are also suitable for the selective sorption of heavy metal ions, such as, for example, zinc, copper or mercury ions, from aqueous solutions. The copolymers according to the invention are preferentially suitable for the sorption of carboxylic acids, in particular from aqueous solutions thereof.

In the sorption of carboxylic acids, the copolymers according to the invention exhibit a sorptive capacity at least 100% higher than that of the exchangers according to German Patent No. 3,043,766 C2, while at the same time having a lower swelling capacity in solvents. The sorption is carried out in a manner which is in itself known. As a rule, the column or fixed bed process is used, in which the sorbent is used to fill a column through which the solvent containing one or more acid substances flows until the capacity of the exchanger is exhausted. The desorption of the sorbed acid substances is then also carried out in a manner which is in itself known, for example using alkali metal hydroxide solutions or, preferably, by means of organic solvents, such as, for example, an alcohol, such as methanol, ethanol, i-propanol or n-butanol, a ketone, such as acetone, methyl ethyl ketone and diethyl ketone, an ester, such as methyl or ethyl acetate, ethyl glycol acetate or ethyl diglycol acetate, or an ether, such as, for example, tetrahydrofuran, dioxane or ethylene glycol dimethyl or diethyl ether. The desorbed acid substances can be taken for another use.

The sorption and desorption of acid substances by means of the polymers according to the invention can also be carried out by other known sorption processes, such as, for example, continuous processes employing a moving bed, the fluidised bed process or batch operation.

The heavy metal ions are also sorbed and desorbed on the adsorber resins according to the invention in a manner which is in itself known.

In the case of the copolymers according to the invention, the content of one or more N-vinylamides of the formula I effects an improvement in, for example, the sorption of acid substances and, above all, the desorption of acid substances by means of organic solvents. This improvement is considerable, particularly in the case of dicarboxylic and polycarboxylic acids and aldehyde-carboxylic and ketocarboxylic acids and also in the case of fairly high contents of one or more N-vinylamides of the formula I.

The percentages indicated in the following examples are percentages by weight.

EXAMPLE 1

252 g of 1-vinylimidazole and 108 g of N-vinyl-N-methylacetamide are dissolved, together with 10 g of N,N-bis-(methacryloyl)-aminoacetic acid, by adding 7.5 g of 27% strength sodium hydroxide solution, 0.5 g of azoisobutyronitrile is stirred in and the mixture is stirred into a solution of 300 ml of cyclohexane and 1 g of a lipophilic protective colloid. The mixture is heated to an internal temperature of 65° C. with continuous stirring and with nitrogen being passed through, and copolymerisation is carried out for 1 hour.

The resulting copolymer in the form of beads is then filtered off with suction, washed with 50 ml of water and dried. The yield is 314.3 g (approx. 79.4% of theory).

Copolymers having surfaces of similar structure are obtained in the same manner if 10 g of N,N'-methylenebisacrylamide or 10 g of N,N'-methylenebis-N-(methylolacrylamide) are employed instead of N,N-bis-(methacryloyl)-aminoacetic acid.

Unless otherwise specified, the lipophilic protective colloid employed in this example and in the following examples is the commercial product ®LX16-10MA made by Revertex Ltd., Templefields, Harlow, Essex, Great Britain.

EXAMPLE 2

(a) 60 g (0.638 mol) of 1-vinylimidazole, 60 g (0.6060 mol) of N-vinyl-N-methylacetamide are dissolved, together with 11.9 g (0.07727 mol) of N,N'-methylenebisacrylamide and with 0.75 g of 4,4'-azobiscyanopentanoic acid, in 135 ml of water, and the solution is then stirred into a mixture of 459 ml of petroleum ether of boiling range 100° to 140° C. and 231 ml of perchloroethylene and 3 g of a lipophilic protective colloid.

The mixture is heated to 60° to 70° C. with continuous stirring and with nitrogen being passed through, and copolymerisation is carried out for 1 hour. The water is removed by azeotropic distillation and the residue is separated off and washed with methanol.

The yield is 107.2 g (approx. 81.2% of theory) of bead-shaped copolymer.

(b) An equally good copolymer in the form of beads is obtained by copolymerising, under identical conditions, a mixture of 72 g (0.7659 mol) of 1-vinylimidazole, 168 g (1.696 mol) of N-vinyl-N-methylacetamide and 23.8 g (0.1545 mol) of N,N'-methylenebisacrylamide.

(c) It is also possible to copolymerise a mixture consisting of 54 g (0.5744 mol) of 1-vinylimidazole, 306 g (3.09 mol) of N-vinyl-N-methylacetamide and 35.6 g (0.231 mol) of N,N'-methylenebisacrylamide.

EXAMPLE 3

(a) 52 g (0.3376 mol) of N,N'-methylenebisacrylamide and 0.75 g of 4,4'-azobiscyanopentanoic acid are dissolved at 30° C. in 78 g (0.7878 mol) of 1-vinylimidazole and 130 g (1.313 mol) of N-vinyl-N-methylacetamide, and the solution is stirred into a mixture of 459 ml of petroleum ether (boiling range 100° to 140° C.) and 231 ml of perchloroethylene, including 3 g of a lipophilic protective colloid. The mixture is heated to 65° to 70° C. with continuous stirring and with nitrogen being passed through, and copolymerisation is carried out for 1.5 hours. The water is removed by azeotropic distillation, and the residue is filtered off with suction, washed with methanol and dried.

A copolymer in the form of beads and having a porous surface structure is obtained.

(b) A copolymer in the form of beads and of the same structure and having equally good properties is obtained if N,N'-methylenebisacrylamide is replaced in the preceding example by the same amount of N,N'-methylenebismethacrylamide.

(c) 252 g (2.680 mol) of 1-vinylimidazole, 108 g (1.09 mol) of N-vinyl-N-methylacetamide and 35.7 g (0.2318 mol) of N,N'-methylenebisacrylamide are dissolved, together with 2.25 g of 4,4'-azobiscyanopentanoic acid, in 405 ml of water, and the solution is then stirred into a mixture of 1,377 ml of petroleum ether of boiling range 100° to 140° C., 693 ml of perchloroethylene, 9 g of a lipophilic protective colloid and 11.2 g of 1,7-bis-(2-hydroxypropyl)-1,1,3,3,5,5,7,7-octamethyltetrasiloxane bisacrylate. The mixture is heated to 80° to 85° C. with stirring and with nitrogen being passed through, and polymerisation is carried out for 45 minutes. The water is removed by azeotropic distillation and the resulting product is washed with acetone.

The yield of porous polymer in the form of beads is 314.3 g (that is to say 77.3% of theory).

(d) 60 g (0.638 mol) of 1-vinylimidazole, 60 g (0.606 mol) of N-vinyl-N-methylacetamide and 11.9 g (0.077 mol) of N,N'-methylenebisacrylamide are dissolved, together with 0.75 g of 4,4'-azobiscyanopentanoic acid, in 135 ml of water, and the solution is stirred into a mixture of 459 ml of petroleum ether of boiling range 100° to 140° C. and 231 ml of perchloroethylene and 3 g of a lipophilic protective colloid and 3.75 g of 1,7-bis-(2-hydroxypropyl)-1,1,3,3,5,5,7,7-octamethyltetrasiloxane bisacrylate. The mixture is heated to 60° to 70° C. with stirring and with nitrogen being passed through, and polymerisation is carried out for 30 minutes. Stirring is then continued for a further hour and the water is removed by azeotropic distillation. The polymer is separated off and washed with acetone.

The yield is 187.2 g (approx. 81% of theory).

(e) 78 g (0.8297 mol) of 1-vinylimidazole, 130 g (1.313 mol) of N-vinyl-N-methylacetamide and 52 g (0.337 mol) of N,N'-methylenebisacrylamide are dissolved, together with 1.5 g of 4,4'-azobiscyanopentanoic acid, in 271 ml of water, and the solution is stirred into a mixture of 918 ml of petroleum ether of boiling range 100° to 140° C., 462 g of perchloroethylene, 6 g of a lipophilic protective colloid and 7.5 g of 1,7-bis-2-hydroxypropyl-1,1,3,3,5,5,7,7-octamethyltetrasiloxane bisacrylate. The mixture is heated to 60° to 70° C. with stirring and with nitrogen being passed through, and polymerisation is carried out for 30 minutes. Stirring is then continued for a further hour and the water is removed by azeotropic distillation.

The yield is 217 g (approx. 83.5% of theory).

EXAMPLE 4

(a) 30 g of 1-vinylimidazole and 10 g of N-vinylacetamide are stirred at 30° C. with 5 g of N,N'- methylenebisacrylamide, and 45 g of water containing 0.25 g of 4,4'-azobiscyanopentanoic acid are added. This solution is stirred into 300 ml of n-heptane containing 1 g of a lipophilic protective colloid. The mixture is heated to 70° to 75° C. with continuous stirring and with nitrogen being passed through, and copolymerisation is carried out for 1 hour. The resulting copolymer in the form of beads is separated off, washed and dried.

The yield is 44 g.

(b) A copolymer in the form of beads is obtained in the same manner, if 10 g of N-vinyl-N-ethylacetamide or 10 g of N-vinylbutyramide are employed instead of 10 g of N-vinylacetamide.

EXAMPLE 5

(a) 120 g of 1-vinylimidazole, 40 g of N-vinyl-N-methylacetamide and 20 g of N,N'-methylenebisacrylamide are stirred at room temperature with 180 ml of water and 1 g of 4,4'-azobiscyanopentanoic acid. This solution is stirred into 1,200 ml of n-heptane containing 4 g of a lipophilic protective colloid. The mixture is heated to 65° to 70° C. with continuous stirring and with nitrogen being passed through, and copolymerisation is carried out for 2 hours. The resulting copolymer in the form of beads is separated off, washed and dried.

The yield is 162 g.

(b) If 40 g of N-vinylformamide are employed instead of 40 g of N-vinyl-N-methylacetamide, a product having an equally good bead structure is obtained.

EXAMPLE 6

(a) 30 g of 1-vinyl-1,2,4-triazole and 10 g of N-vinylformamide are stirred together with 10 g of N,N'-methylenebismethacrylamide and 0.25 g of 4,4'-azobiscyanopentanoic acid, and 50 ml of water are added. This solution is added dropwise to a solution of 1 g of a lipophilic protective colloid in 300 ml of n-pentane, and the mixture is heated to 70° C. with continuous stirring and with nitrogen being passed through. Copolymerisation is then carried out for 1 hour. The resulting copolymer in the form of beads is filtered off with suction, washed with acetone and dried.

The yield is 45 g.

(b) A product of the same appearance and surface is obtained if the amount of 1-vinyl-1,2,4-triazole is replaced by an equal amount of 3-vinyl-5-methyl-1,2,4-oxadiazole.

It is also possible to replace the 1-vinyl-1,2,4-triazole by an equal amount of 2-vinyl-1,2,3,4-tetrazole.

The resulting copolymers have the same properties.

EXAMPLE 7

40 g of 1-vinyl-1,2,3,4-tetrazole and 5 g of N-vinylformamide are stirred together with 10 g of N,N'-methylenebismethacrylamide and 0.25 g of 4,4'-azobiscyanopentanoic acid, and 50 ml of water are added. This solution is added dropwise to a solution of 1 g of a lipophilic protective colloid in 300 ml of n-pentane and the mixture is heated to 70° C. with continuous stirring and with nitrogen being passed through. Copolymerisation is then carried out for 1 hour. The resulting copolymer in the form of beads is filtered off with suction, washed with acetone and dried.

The yield is 48 g.

Equally good crosslinked copolymers in the form of beads are obtained if 20 g of 1-vinyl-1,2,3,4-tetrazole, 10 g of 1-vinylimidazole and 10 g of N,N'-methylenebismethacrylamide are copolymerised under the conditions mentioned above.

EXAMPLE 8

30 g of 1-allyl-1,2,3,4-tetrazole, 10 g of N,N'-methylenebismethacrylamide, 5 g of N-vinyl-N-methylacetamide, 5 g of 1-methyl-5-vinyl-1,2,3,4-tetrazole and 0.25 g of 4,4'-azobiscyanopentanoic acid are stirred together, and 50 ml of water are added. The solution thus prepared is added dropwise to a solution of 1 g of a lipophilic protective colloid in 400 ml of n-pentane and the mixture is heated to 70° C. with continuous stirring and with nitrogen being passed through. Copolymerisation is then carried out for 1 hour. The resulting copolymer in the form of beads is filtered off with suction, washed with methanol and dried.

The yield is 45 g.

A highly crosslinked copolymer in the form of beads and having an equally good adsorption is obtained if 1-allyl-1,2,3,4-tetrazole is replaced by the same amount of 3-vinyl-1,2,4-oxadiazole or by 3-isopropenyl-1,2,4-oxadiazole.

EXAMPLE 9

40 g of 2-isopropenyl-1,3,4-oxadiazolin-5-one, 5 g of N-vinylformamide and 10 g of diallyl vinylphosphonate are stirred together with 0.25 g of 4,4'-azobiscyanopentanoic acid, and 50 ml of water are added. The solution thus prepared is added to a solution of 2 g of a lipophilic protective colloid in 300 ml of cyclohexane. The mixture is heated to 60° C. with continuous stirring and with nitrogen being passed through, and copolymerisation is carried out for 1 hour. The resulting highly crosslinked copolymer in the form of beads is washed with acetone and dried.

EXAMPLE 10

30 g of 2-vinyl-2-oxazoline and 10 g of N-vinyl-N-methylacetamide, together with 20 g of N,N-bis-(methacryloyl)-aminoacetic acid and with the addition of 15 g of 27% strength sodium hydroxide solution and 1 g of azodiisobutyronitrile are stirred together, and the mixture is added to a solution of 1 g of hydroxyethylcellulose (as the lipophilic protective colloid) in 300 ml of cyclohexane. The mixture is heated to an internal temperature of 65° C. with continuous stirring and with nitrogen being passed through, and copolymerisation is carried out for 1 hour.

The yield is 50 g of copolymer in the form of beads.

It is possible to obtain equally good highly crosslinked copolymers in the same manner if 30 g of 2-vinyl-2-oxazoline are replaced by 30 g of 2-isopropenyl-2-oxazoline or by 30 g of 2-vinyl-3-methyloxazolidine. Similar yields of products having comparable properties are then obtained.

EXAMPLE 11

30 g of 4-vinylthiazole and 10 g of N-vinyl-N-methylacetamide are stirred together with 20 g of N,N'-methylenebis-(N-methylolacrylamide) and 1 g of 4,4'-azobiscyanopentanoic acid, and 45 ml of water are added and the whole mixture is then added to a solution of 1 g of a lipophilic protective colloid in 300 ml of n-pentane. The mixture is heated to 70° C. with continuous stirring and with nitrogen being passed through, and copolymerisation is carried out for 1 hour. The resulting highly crosslinked copolymer in the form of beads is separated off, washed and dried.

The yield is 55 g.

A copolymer in the form of beads and having an equally good structure can be obtained in the same manner if 30 g of 4-vinylthiazole are replaced by 30 g of 2-vinylthiazole.

EXAMPLE 12

The pH of a mixture of 30 g of N-vinyl-2-imidazoline and 10 g of N-vinyl-N-methylacetamide and 20 g of trisacryloylperhydrotriazine is adjusted to 9 by adding 7.5 g of 27% strength aqueous sodium hydroxide solution, 0.5 g of azoisobutyronitrile is added, and this solution is stirred into a solution of 300 ml of cyclohexane and 1 g of a lipophilic protective colloid. The mixture is heated to 70° C. with continuous stirring and with nitrogen being passed through, and copolymerisation is carried out for 1 hour. The resulting highly crosslinked copolymer in the form of beads is separated off, washed with methanol and dried.

The yield is 50 g.

Equally good copolymers in the form of beads are obtained if 1-vinyl-2-imidazoline is replaced by 1-vinyl-2-methylimidazole.

EXAMPLE 13

(a) 35 g of 1-vinylimidazole, 5 g of N-vinyl-N-methylacetamide, 2.5 g of N,N'-methylenebisacrylamide and 2.5 g of 1,7-bis-( 2-hydroxypropyl)-1,1,3,3,5,5,7,7-octamethyl tetrasiloxane bisacrylate are dissolved, together with 4,4'-azobiscyanopentanoic acid in 45 ml of water, and the mixture is stirred into 300 ml of n-heptane and 1 g of a lipophilic protective colloid. The mixture is heated to 70° C. with continuous stirring and with nitrogen being passed through, and copolymerisation is carried out for 1 hour. The resulting highly crosslinked copolymer of bead-shaped structure is separated off, washed with acetone and dried.

The yield is 42 g.

(b) A copolymer in the form of beads and having the same properties is obtained in the same manner by using 2.5 g of N,N'-methylenebismethacrylamide and 2 g of 3-triethoxysilylpropyl methacrylate instead of N,N'-methylenebisacrylamide and 1,7-bis-(2'-hydroxypropyl)-1,1,3,3,5,5,7,7-octamethyltetrasiloxane bisacrylate.

(c) A similar copolymer in the form of beads is obtained by using 35 g of 1-vinyl-1,2,3,4-tetrazole, 5 g of N-vinylformamide, 2.5 g of N,N'-methylenebisacrylamide and 2.5 g of vinyltriethoxysilane.

EXAMPLE 14

60 g (0.638 mol) of 1-vinylimidazole, 60 g (0.606 mol) of N-vinyl-N-methylacetamide and 11.9 g (0.036 mol) of polyethylene glycol 200 dimethacrylate are dissolved, together with 0.75 g of 4,4'-azobiscyanopentanoic acid in 135 ml of water, and the mixture is stirred into a mixture of 459 ml of petroleum ether of boiling range 100° to 140° C. and 231 ml of perchloroethylene which also contains 3 g of a lipophilic protective colloid and 3.75 g of 1,7-bis-(2-hydroxypropyl)-1,1,3,3,5,5,7,7-octamethyltetrasiloxane bisacrylate, with stirring and with nitrogen blanketing. The mixture is heated to 70° C., copolymerisation is carried out for 30 minutes and stirring is continued for a subsequent hour.

The yield is 90.5 g (approx. 68.6% of theory). A product having equally good properties is obtained if 11.9 g (0.016 mol) of polyethylene glycol 600 dimethacrylate are employed instead of polyethylene glycol 200 dimethacrylate.

EXAMPLE 15

60 g (0.638 mol) of 1-vinylimidazole, 60 g (0.606 mol) of N-vinyl-N-methylacetamide and 11.9 g (0.028 mol) of N,N',N''-tris-(2-acryloyloxyethyl) isocyanurate are dissolved, together with 0.75 g of 4,4'-azobiscyanopentanoic acid, in 135 ml of water, and the mixture is stirred into a mixture of 459 ml of petroleum ether of boiling range 100° to 140° C. and 231 ml of perchloroethylene, with stirring and with nitrogen blanketing, and the whole mixture is warmed to 70° C. and polymerisation is carried out at this temperature for 1 hour.

The mixture of organic solvents also contains 3 g of a lipophilic protective colloid and 3.75 g of 1,7-bis-(2-hydroxypropyl)-1,1,3,3,5,5,7,7-octamethyltetrasiloxane bisacrylate.

The yield is 107.8 g (approx. 81.7% of theory).

EXAMPLE 16

100 g (1.06 mol) of 1-vinylimidazole, 20 g (0.202 mol) of N-vinyl-N-methylacetamide and 11.9 g (0.036 mol) of polyethylene glycol 200 dimethacrylate are dissolved, together with 0.75 g of 4,4'-azobiscyanopentanoic acid, in 135 ml of water, and the mixture is stirred, with nitrogen blanketing, into a mixture of 459 ml of petroleum ether of boiling range 100° to 140° C. and 231 ml of perchloroethylene which also contains 3 g of a lipophilic protective colloid and 3.75 g of 1,7-bis-(2-hydroxypropyl)-1,1,3,3,5,5,7,7-octamethyltetrasiloxane bisacrylate. The whole mixture is then heated to 70° C. and polymerisation is carried out for 1 hour. The product is then separated off and washed with acetone.

Yield: 100.2 g (approx. 76% of theory).

EXAMPLE 17

60 g (0.638 mol) of 1-vinylimidazole, 60 g (0.606 mol) of N-vinyl-N-methylacetamide, 5.95 g (0.018 mol) of polyethylene glycol 200 dimethacrylate and 5.95 g (0.038 mol) of N,N'-methylenebisacrylamide are dissolved, together with 0.75 g of 4,4'-azobiscyanopentanoic acid, in 135 ml of water, and the mixture is stirred with nitrogen blanketing into a mixture of 459 ml of petroleum ether of boiling range 100° to 140° C. and 231 ml of perchloroethylene which also contains 3 g of a lipophilic protective colloid and 3.75 g of 1,7-bis-(2-hydroxypropyl)-1,1,3,3,5,5,7,7-octamethyltetrasiloxane bisacrylate, and the whole mixture is heated to 70° C. and polymerisation is carried out for 1 hour.

The yield is 114.4 g (approx. 86.7% of theory).

EXAMPLE 18

25 g (0.266 mol) of 1-vinylimidazole, 5 g (0.050 mol) of N-vinyl-N-methylacetamide, 10 g of β-hydroxyethyl methacrylate and 5 g (0.005 mol of N,N'-methylenebisacrylamide are dissolved, together with 0.25 g of 4,4'-azobiscyanopentanoic acid, in 45 ml of water, and the mixture is stirred with nitrogen blanketing into 230 ml of n-heptane containing 1 g of a lipophilic protective colloid and 2.5 g of bis-(2-hydroxypropyl)-1,1,3,3,5,5,7,7-octamethyltetrasiloxane bisacrylate. The whole mixture is then heated to 77° C., polymerisation is carried out for 1 hour and the product is separated off after being washed with acetone.

Yield: 45.3 g (approx. 100% of theory).

EXAMPLE 19

The exchange capacity is determined by packing a glass column of internal diameter 25 mm with 50 g of copolymer and passing a 1% strength aqueous solution of D-lactic acid through at a rate of 2.0 bed volumes/hour until the outflow becomes acid. In order to desorb the D-lactic acid, 650 ml of methanol or acetone are passed through the column at a rate of 1.8 bed volumes/hour, and the D-lactic acid in the eluate is determined quantitatively by an enzymatic method using lactate dehydrogenase. The capacity values in the table which follows are obtained in this determination of capacity by sorption and desorption when using various copolymers:

| Copolymer according to | Capacity in g of D-lactic acid/ 100 g of polymer |
| --- | --- |
| Example 4 | 45 |
| Example 5a | 48 |
| Example 5b | 46 |
| Example 6a | 71 |
| Example 13a | 81 |
| Example 13b | 76 |
| Example 13c | 74 |
| Example 1 of German Patent 3,043,766 C2 | 8 |

It is possible to use the new copolymers according to the invention in the same way to sorb, for example, formic acid, acetic acid, propionic acid, n-butyric acid, i-butyric acid, valeric acid, caproic acid, capric acid, glycollic acid, malic acid, malonic acid, succinic acid, oxalic acid, glutaric acid, adipic acid, maleic acid, fumaric acid, citric acid, tricarballylic acid, tartaric acid, glyoxylic acid and phenols, and then to elute these products again with solvents, such as, for example, acetone, methanol, ethyl acetate, tetrahydrofuran, dioxane or dimethoxyethane.

EXAMPLE 20

100 g of an acid aqueous filtrate produced in the manufacture of gamma-acid (1-hydroxy-7-aminonaphthalene-3-sulphonic acid), containing gamma-acid, sulphuric acid and sodium salts, in particular also the sodium salt of gamma-acid, are stirred for 30 minutes with 50 g of water and 10 g of the product according to Example 4. The solid is then filtered off with suction and washed with water.

The acidity and the diazotisable constituents in the solution are determined as follows before and after the treatment with the adsorber resin. (The determination of diazotisable constituents measures the content of gamma-acid plus Na salt of gamma-acid):

| | Before the treatment | After the treatment |
| --- | --- | --- |
| Acidity | 3.06 milliequivalents | 0.204 milliequivalent |
| Diazotisable constituents | 1.66 mol % | 0.05 mol % |

The adsorption capacity is calculated to be 93.3%. Not only gamma-acid but also its Na salt is sorbed.

Desorption is carried out, for example, using dilute sodium hydroxide solution.

EXAMPLE 21

2 g of the product according to Example 4 are suspended in a water-methanol mixture (volume ratio 1:1) and are placed in a glass column of diameter 1.5 cm. The bed is washed with 500 ml of water.

An aqueous solution of zinc chloride having a pH of 2 and a $Zn^{++}$ content of $1\times10^{-6}$ g/ml is then poured into the column, and the zinc content is determined in the fractions into which the flow is divided. In the first 1,280 ml of flow, the $Zn^{++}$ content is below $1\times10^{-8}$ g/ml; it then rises to $1.2\times10^{7}$ g/ml.

We claim:

1. Crosslinked, porous copolymer in the form of beads, containing 50 to 99.9% by weight of recurring units of a heterocyclic 5-membered ring compound which contains a polymerisable olefinic group and which has at least one protonisable nitrogen atom in the ring, or several such compounds, 0.1 to 50% by weight of units of a crosslinking agent or several such crosslinking agents, 0 to 25% by weight of units of a polymerisable organoboron and/or organosilicon compound or several such compounds and, relative to 100% by weight of the sum of the abovementioned units, 5 to 350% by weight of units of an N-vinylamide of the general formula I $CH_2=CH-N(R^1)-C(R^2)=O$ wherein $R^1$ denotes hydrogen, methyl or ethyl and $R^2$ denotes hydrogen or $C_1-C_3$-alkyl, or several such N-vinylamides and 0 to 40% by weight of units of another polymerisable compound or several such compounds.

2. Copolymer according to claim 1 containing 50 to 95% by weight of recurring units of a heterocyclic 5-membered ring compound which contains a polymerisable olefinic group and has at least one protonisable nitrogen atom in the ring, or several such compounds, 5 to 50% by weight of units of a crosslinking agent or several such crosslinking agents, 0 to 25% by weight of units of polymerisable organoboron or organosilicon compound or several such compounds and, relative to 100% by weight of the sum of the abovementioned units, 10 to 250% by weight of units of an N-vinylamide of the general formula I or several such N-vinylamides and to 25% by weight of units of another polymerisable compound or several such compounds.

3. Copolymer according to claim 1 or 2, characterised in that it contains 0.1 to 10% by weight of units of a polymerisable organoboron or organosilicon compound.

4. Copolymer according to claims 1 or 2, characterised in that it contains no units of other polymerisable compounds.

5. Copolymer according to claims 1 or 2, characterised in that it contains, as the crosslinking agent, units of N,N'-methylenebisacrylamide and/or N,N'-methylenebismethacrylamide and/or ethylene glycol diacrylate and/or ethylene glycol dimethacrylate and/or diethylene glycol diacrylate and/or diethylene glycol dimethacrylate and/or polyethylene glycol 200 to 600 diacrylate and/or polyethylene glycol 200 to 600 dimethacrylate and/or N,N',N"-tris-(2-acryloyloxyethyl) isocyanurate and/or N,N',N"-tris-(2-methacryloyloxyethyl) isocyanurate.

* * * * *